United States Patent [19]

Kelly et al.

[11] Patent Number: 5,228,895
[45] Date of Patent: Jul. 20, 1993

[54] FERTILIZER AND LIMESTONE PRODUCT

[75] Inventors: Richard B. Kelly, Edina; William L. Gosney, Novelty, both of Mo.

[73] Assignee: Kelly Lime and Rock Company, Inc., Newark, Mo.

[21] Appl. No.: 867,287

[22] Filed: Apr. 10, 1992

Related U.S. Application Data

[63] Continuation of Ser. No. 688,151, Apr. 11, 1991, abandoned.

[51] Int. Cl.$^5$ .......................... C05D 3/02; C05G 3/08; C05G 3/10
[52] U.S. Cl. ........................ 71/63; 71/64.05; 23/313 R; 423/555
[58] Field of Search .............. 71/61, 63, 64.05; 423/555; 23/313 R, 313 P

[56] References Cited

U.S. PATENT DOCUMENTS

| | | | |
|---|---|---|---|
| 2,061,534 | 11/1936 | Balz et al. | 71/61 |
| 3,214,261 | 10/1965 | Galloway | 71/51 |
| 3,408,169 | 10/1968 | Thompson et al. | 23/313 |
| 3,692,511 | 9/1972 | Wilson et al. | 71/29 |
| 4,015,973 | 4/1977 | Perrine | 71/63 |
| 4,369,055 | 1/1983 | Fujita et al. | 71/64.11 |
| 4,410,350 | 10/1983 | Judd | 71/63 |
| 4,846,871 | 7/1989 | Detroit | 71/25 |
| 4,954,134 | 9/1990 | Harrison et al. | 71/63 X |

*Primary Examiner*—Ferris Lander
*Attorney, Agent, or Firm*—Cohn, Powell & Hind

[57] ABSTRACT

Nitrogen compounds are a source of soil acidity. In addition nitrates are a major factor in the leaching of other nutrient salts from soils. These salts are then replaced by the available hydrogen ions, rendering the soil even more acidic. Besides supplying nutrients, a desirable fertilizer should offset changes in soil acidity brought about by nitrification. Calcium carbonate accomplishes this. Unfortunately it has not been possible commercially to include calcium carbonate in a fertilizer. If $CaCO_3$ particles are ground too large they do not dissolve along with the agricultural fertilizer nutrients. If $CaO_3$ is pulverized to a state necessary for dissolution, because of its hygroscopic properties, it hardens or cakes. It is not sufficiently stable in admixture with the other fertilizer materials for commercial distribution. Herein a fertilizer is provided which improves the condition of the soil, and stimulates microbial activity in the soil. It also has a shelf life rendering it marketable commercially. Rather than forming agglomerates or pellets in the form of a binder-$CaCO_3$ matrix as has been the practice heretofore, only the outer layer of the pellets herein are in matrix form.

12 Claims, No Drawings

FERTILIZER AND LIMESTONE PRODUCT

This is a continuation of copending application Ser. No. 07/688,151 filed on Apr. 11, 1991 and now abandoned.

BACKGROUND OF THE INVENTION

This invention pertains to mixed fertilizers, that is those providing primary nutrients in particulate form, and to the preparation of such fertilizers.

One of the disadvantages of commercially available fertilizers is that they do not compensate for the changes in soil acidity which are due to the fertilizer being applied. In solid fertilizers nitrogen has been derived from sodium and potassium nitrates. Now it is usually derived from ammonium salts, such as nitrates and phosphates, or from urea, which hydrolyzes to form ammonium carbonate. Plants can use ammoniacal nitrogen, but most of it is converted to the nitrate form of nitrogen by nitrifying bacteria. Therefore, it is usually the nitrate that is available for use by crops.

During the nitrification process when bacteria convert ammonium ions to nitrate ions, hydrogen ions are released. These hydrogen ions are attracted to and held by soil colloids. The more hydrogen ions involved in this exchange complex the greater the acidity of the soil. At that point nitrification slows down since nitrification rates are usually low in acid soils.

It will be appreciated that nitrogen compounds are a source of soil acidity. In addition nitrates are a major factor in the leaching of other nutrient salts such as calcium and magnesium and other cationic nutrients from soils. These bases are replaced by the available hydrogen ions, rendering the soil even more acidic.

It is to be understood that in addition to supplying nitrogen, phosphorous and potassium (N-P-K), a desirable fertilizer should offset soil acidity changes brought about by nitrification. Calcium carbonate accomplishes this. It reduces soil acidity through base exchange. The calcium ions of the calcium carbonate replace hydrogen ions in the soil, preliminarily forming $H_2CO_3$. In solution the resulting carbonic acid gives off carbon dioxide, leaving water in the soil. As pointed out in U.S. Pat. No. 4,015,973 fertilizers have what is known as a "potential acidity in terms of calcium carbonate equivalent" which should be indicated on each bag of fertilizer. The object is to mix $CaCO_3$ in the right proportions with the N-P-K fertilizer nutrients to neutralize the potential acidity thereof. By "fertilizer nutrients" we mean primary nutrients, although secondary nutrients other than calcium, along with micronutrients can be included. Unfortunately on a commercial scale this has not been accomplished.

If ground $CaCO_3$ particles are too large the exposed surface area is insufficient for the desired chemical reactions. In the pulverized state of $CaCO_3$ necessary for dissolution, because of its hygroscopic properties, a form of $CaCO_3$ which is sufficiently stable in admixture with the fertilizer materials for commercial distribution has not been achieved.

In U.S. Pat. No. 4,015,973 a process is provided for making a pelletized limestone-bentonite soil neutralizer. It is asserted that the final product is not materially affected by exposure to the atmosphere. However, with the bentonite in matrix form throughout the pellets it is not possible to make a commercially successful product. If the clay is heated too high, approaching a ceramic, the entire pellet will be hard. Otherwise, on the absorption of water the swelling action of the clay causes the particles to crumble. In the formation of the granules in U.S. Pat. No. 4,015,973 the $CaCO_3$ and bentonite are dry mixed. They are then pelletized using water as the binder. The result is a $CaCO_3$-bentonite matrix which is too soft for commercial acceptance. George G. Judd alludes to this in U.S. Pat. No. 4,410,350. Referring to U.S. Pat. No. 4,015,973 Judd points out that no previously suggested fertilizer composition has included a filler which materially reduces the tendency of the active fertilizer ingredients to cake on standing in more or less humid conditions. Unless bentonite is heated to a hard clay it swells and cakes.

In U.S. Pat. No. 3,214,261 limestone is mixed with a non-phytotoxic binding agent. In a disc granulator water is added to activate the mix. Here again the non-phytotoxic binding agent is disseminated throughout the pellet. In U.S. Pat. No. 4,954,134 a lignosulfonate is employed. It bonds the particles as they are being agglomerated, and hence is embedded throughout as a continuous matrix.

The matrix binders of the prior art have, therefore, not been totally satisfactory. Judd (U.S. Pat. No. 4,410,350) solves this matrix problem by pelletizing with water and then forming a hard, outer skin around them. However, to accomplish this, Judd treats the pellets with a carbon dioxide-containing gas at a rate of fifty tons per hour at 680° F. Herein the problem is solved without the high temperature gas treating equipment.

SUMMARY OF THE INVENTION

An object of this invention is to provide a fertilizer blend containing calcium carbonate which prevents an increase in soil acidity. In addition the blend, due to the flocculating property of calcium carbonate, improves the structure of the soil, and stimulates microbial activity in the soil. No fertilizer is available commercially which achieves these objects. Attempts to achieve these objects heretofore have resulted in a product which either formed excessive dust on being mixed with the N-P-K fertilizer ingredients, or does not have a shelf life rendering it commercially marketable.

Rather than forming an agglomerate in the form of a binder-$CaCO_3$ matrix as has been the practice heretofore, only the outer layer of the agglomerates herein is in matrix form. This obviates Judd's high temperature gas treatment. By "agglomerate" is meant pellets and irregularly shaped particles, both of which are formed by the consolidation of smaller particles.

DESCRIPTION OF THE PREFERRED EMBODIMENTS

Fertilizer nutrients are old in the art. Primary nutrients for solid fertilizers are nitrogen, phosphorous and potassium supplied by such chemicals as ammonium nitrate, ammonium sulfate, alkali metal nitrates, urea, rock phosphate, mono and diammonium phosphate, bone meal slag, aluminum phosphate and potassium salts such as chlorides, sulfates and nitrates. The agricultural nutrients are well known and need not be discussed at length herein except to say that secondary and micronutrients for instance magnesium, sulfur, chlorine, iron, copper, zinc and others, can be included depending on deficiency symptoms and desirability. The prime consideration herein is the combination of these fertilizer nutrient-providing chemicals with calcium carbonate in a sufficiently stable form for commercial distribution.

Agglomerating techniques are as well known as the fertilizer ingredients themselves. The agglomerates or pellets are consolidated or pelletized in rotary-type drums or pan granulators. Instead the focus herein is on the product made in such tumbling equipment.

Disc pelletizing is our preferred pelletizing process, which normally utilizes pulverized or finely ground calcium carbonate and water. The calcium carbonate is agglomerated into granules or pellets by the addition of the water as a binder, and then the moistened particles are compacted as they roll down the surface of the disc pan. Close size control is easy to achieve since the disc pelletizer is a material classifier. Pellet size is controlled by the calcium carbonate feed, and water (binder) spray locations. Our concern, then, is not the pelletizing operation, but operating the pelletizer to make a novel product, in short, by modifying the pelletizing operation. This will be better understood by reference to specific examples.

A pelletizing disc is characterized by the formation during operation of a distinctive pattern of free-flowing fines, agglomerates and finished balls on the disc. Three main pellet streams generally form, containing (a) finished or near-finished pellets, (b) transition or growing balls, and (c) nuclei or seed pellets.

EXAMPLE 1

A standard commercial ten foot pan diameter pelletizer operating at 12.8 RPM and a pan operating angle of 45° with a four nozzle spray system was employed. Products described in this and the following examples were full scale production batches based on a 5 ton per hour output using this disc pelletizer. Pellets produced had the following U.S. Standard Testing Sieve size distribution:
100% passing 4½ mesh opening
80% passing 8 mesh
1% passing 14 mesh For the purpose of making calcium carbonate pellets, finely ground or pulverized calcium carbonate and a water binder were fed to the disc pelletizer operated to produce the pellets characterized above. After the pellets were formed they were dried at 125° F. in a fluid bed dryer. To the touch the pellets appeared to be hard, but they could not be mixed with the N-P-K fertilizer materials without breaking down. In addition on being stored one month in a moist constant humidity room the pellets agglomerated to form lumps in the batches. This caking rendered them unsatisfactory.

EXAMPLE 2

Following the procedure of Example 1 pellets were produced using lignosulfonate (sodium lignosulfonate) instead of water as the binder. Since the resulting pellets had the lignosulfonate binder embedded throughout as a matrix their solubility properties were altered. While the pellets were hard, and did not break down on mixing, they were too insoluble for commercial use.

EXAMPLE 3

The procedure of Example 1 was followed except that both water and a lignosulfonate solution were employed. It is known that pellet sizes are controlled by the powder feed and binder addition locations. In this run, to the calcium carbonate a water binder was first added to form small pellets. At a disc location leading to larger pellets the lignosulfonate binder was added, forming a lignosulfonate layer on the outside of the smaller pellets. In the fluid bed dryer the pellets were dried at a temperature of 200° F. It was found that at that temperature the lignosulfonate appeared to cure, undergoing a color change, forming black insoluble pellets.

EXAMPLE 4

Following the procedure of Example 3 pellets were again produced with an outer layer of lignosulfonate-calcium carbonate around a calcium carbonate pellet formed with a water binder. The production run was separated into three batches. One batch was dried at 125° F., one at 135° F., and one at 180° F. The pellets which were dried at 125° F. and 135° F. appeared to be hard and dark but after three months in a high humidity room they both lightened in color and began to cake. They broke down on being mixed with the N-P-K materials. The pellets dried at 180° F., which appeared to be short of the cure described in Example 3, had extraordinary hardness characteristics. They did not cake in three months, and they still had excellent solubility properties during use.

EXAMPLE 5

It was found that the 180° F. dried pellets of Example 4 could be further improved if the lignosulfonate-calcium carbonate layer were made more dense as the pellets grew. The pelletizer was operated to form the core of calcium carbonate with the water binder, followed by a dilute lignosulfonate binder solution. A more concentrated lignosulfonate binder solution was then introduced at a point promoting further pellet growth, and a slightly larger pellet. This led to the discovery that other water soluble polymers could be used as binders in the second stage (pan zone) to form an outer layer around the pellet formed by using the water binder.

Desirable water soluble polymers in addition to lignosulfonates such as sodium, calcium and ammonium lignosulfonates are polyvinyl alcohol, polyacrylic acid salts, amylose, methylcellulose, hydroxyethylcellulose, corn starch, wheat starch, carboxymethylcellulose, ethylhydroxyethylcellulose, and the like.

As described, calcium carbonate is pelletized using water as the binder to form a core. As an outer layer, around the core thus pelletized, an agglomerate-encompassing deposit is added using additional calcium carbonate and a water soluble polymer as the binder. The calcium carbonate core should be over half of the total pellet diameter, desirably seventy-five to ninety-five percent of the pellet diameter, depending on the polymer binder employed. The solubility of the agglomerate can be made to match the solubilities of the other fertilizer ingredients in the complete N-P-K plus calcium carbonate blend by the thickness of the layer.

As indicated hereinbefore the calcium carbonate agglomerates of this invention can be readily blended or mixed with granular fertilizer ingredients providing N, P and K fertilizer components. The agglomerates herein, with outer layers formed by water soluble polymer binders, mix well with these fertilizer components without breaking down. In addition the product has been found to have a shelf life of over six months. Yet the pellets readily dissolve on application and use.

On blending the ingredients, a fertilizer not available hereinbefore is provided which does not significantly lower the ambient soil pH. The quantities of phosphorus and potassium in the blend are sufficient to meet the plants nutritional requirements. A quantity of nitrogen necessary for the conversion of the phosphorus and potassium, usually into proteins, is included. Calcium carbonate reacts with those hydrogen ions resulting from nitrification to release carbon dioxide and form water, inhibiting the lowering of soil pH and promoting the utilization of all nutrients. In so doing it lessens the movement of unutilized fertilizer ingredients into surface and underground waters so they do not become serious pollutants in streams and wells. The calcium carbonate also provides a much more suitable environment for microbial action, promoting the decay of plant or crop residues such as lawn clipping and crop cuttings by microorganisms. Converting grass clippings and other crop residues to beneficial organic matter will reduce quantities of such materials now being disposed of in garbage landfields by hundreds of thousands of tons annually.

The N-P-K code usually denotes nitrogen, phosphorous and potassium expressed in percentage composition. Thus a 10-10-10 fertilizer is a mixture of 10 weight percent N in the form of a nitrogen compound, 10 weight percent $P_2O_5$ equivalent in the form of a phosphate and 10 weight percent $K_2O$ equivalent in the form of a potassium compound. Herein a 14-8-10-12 N-P-K-Ca fertilizer is preferred, with a recommended spreading of 8 pounds per 1000 square feet.

An important facet of this invention is that the pH of the soil will not be lowered by the fertilizer per se. In other words the soil will not be acidified herein as a result of nitrification. Residual hydrogen ions resulting from nitrification, lower the soil pH and must be neutralized. Each pound of nitrogen added to the soil requires 3.57 pounds of calcium carbonate if nitrogen-caused acidification is to be compensated for. Herein that unfulfilled need is taken care of.

Given the teachings of this invention variations will occur to those skilled in the art. Thus the drying temperatures can vary from 100° F. to 200° F. depending upon the water soluble polymer. As a further example it has been pointed out that secondary nutrients such as sulfur and magnesium, as well as micronutrients such as copper, iron, boron, zinc, molybdenum, and manganese can be included in the fertilizer. The size of the pellets will also be a matter of choice although we prefer the size described in Example 1. We have also illustrated by giving the guide lines, that the amount of calcium carbonate is subject to considerable latitude. As another example, any source of calcium carbonate can be used. Whereas calcitic limestone is preferred, dolomitic limestone, slag, gypsum, marl and burned lime can be used. These and other ramifications will occur to those skilled in the art. They are, therefore, deemed to be within the scope of this invention.

We claim:

1. A process for preparing from finely ground calcium carbonate a granular form of calcium carbonate suitable for mixing with agricultural fertilizer nutrients consisting essentially of first tumbling the finely ground calcium carbonate using water as a binder to agglomerate the finely ground calcium carbonate into core agglomerates, then tumbling the agglomerates thus formed using an aqueous-based water soluble polymer in combination with calcium carbonate as a binder said binder providing means for forming a shell-like layer on the outside of the core agglomerates in the form of a calcium carbonate-water soluble polymer matrix, continuing applying the binder until the shell-like layer is of a suitable thickness and until a required particle-size distribution is achieved and then drying the agglomerates, the dried shell-like layer being of a thickness which provides a means for resisting attrition yet disintegrating and being readily absorbed into vegetation on disintegration of the shell-like layer.

2. The process of claim 1 wherein the calcium carbonate is limestone, the water soluble polymer is lignosulfonate and the drying is effected at a temperature of 160° F. to 180° F.

3. The process of claim 2 wherein a dilute solution of lignosulfonate binder is used, followed by a more concentrated lignosulfonate binder.

4. The process of claim 3 wherein the resulting agglomerates are mixed with N-P-K fertilizer ingredients to form a 14-8-10-12 (N-P-K-Ca) dry fertilizer mix.

5. The process of claim 1 wherein the water soluble polymer is polyvinyl alcohol.

6. A noncaking fertilizer component compensating for nitrification acidity, the fertilizer being granular agricultural fertilizer nutrients in physical admixture with calcium carbonate in the form of agglomerates, said agglomerates consisting essentially of a finely ground calcium carbonate core having a water binder and having means for providing a core-encompassing deposit of a water soluble polymer-calcium carbonate matrix providing a shell-like layer for the core having a thickness providing a resistance to attrition and caking but being readily disintegrated and absorbed into the vegetation on disintegration of the shell-like layer.

7. The fertilizer component of claim 6 wherein the water soluble polymer is lignosulfonate.

8. The fertilizer component of claim 6 wherein the outer layer is less than one-fourth of the granule diameter.

9. The fertilizer component of claim 6 in admixture with N-P-K solid fertilizer ingredients to form a N-P-K-Ca fertilizer.

10. The fertilizer of claim 9 wherein the blend contains phosphorus and potassium in amounts sufficient for a plant's requirements, wherein the blend includes a quantity of nitrogen necessary for conversion of phosphorus and potassium, and wherein the blend includes sufficient calcium carbonate to react with nitrification-released hydrogen ions to inhibit the lowering of soil pH, to promote utilization of nutrients and to provide a more suitable environment for microbial action, the fertilizer blend lessening movement of fertilizer ingredients into surface and underground waters.

11. The fertilizer of claim 9 wherein the blend is in the form of a 14-8-10-12 N-P-K-Ca fertilizer.

12. The fertilizer of claim 9 having the following size distribution: 100 percent passing 4½ mesh opening; 80 percent passing 8 mesh; and 1 percent passing 14 mesh, U.S. Standard Testing Sieve.

* * * * *